UNITED STATES PATENT OFFICE.

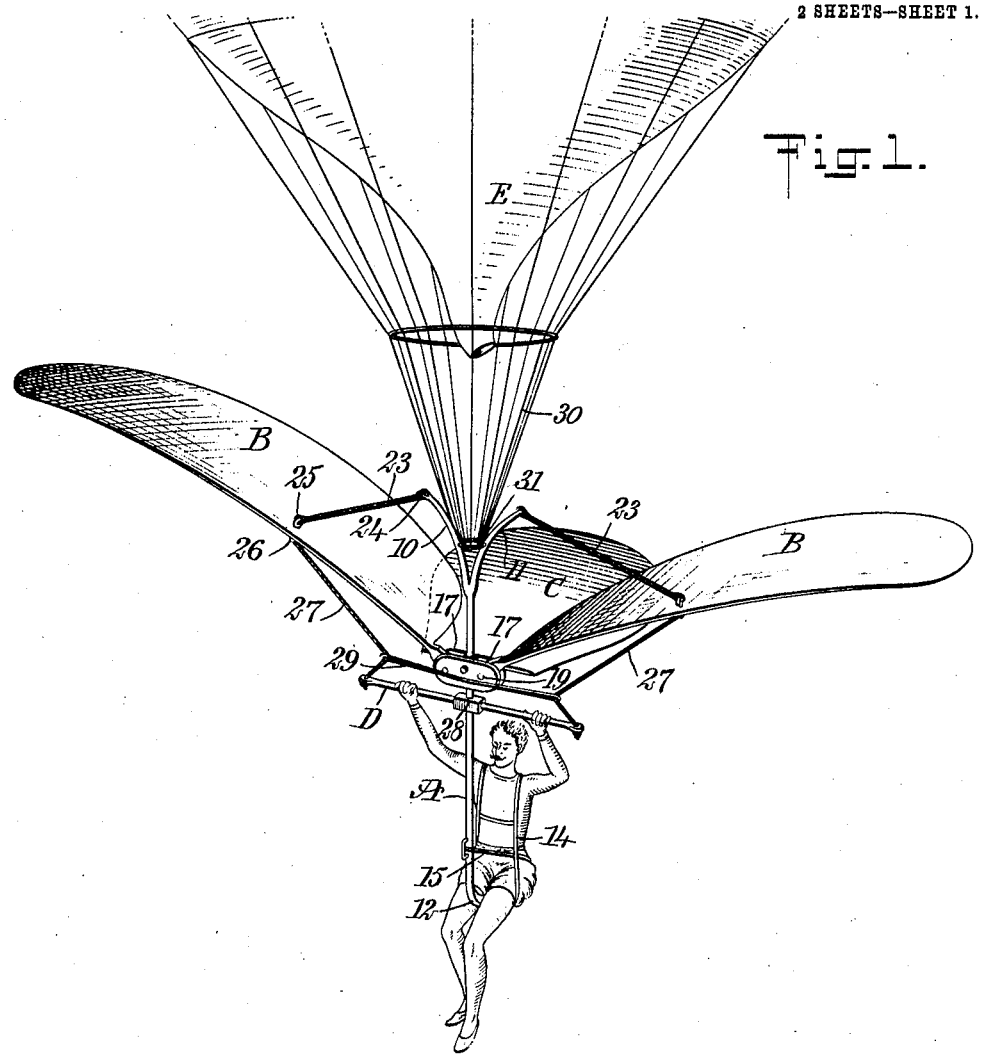

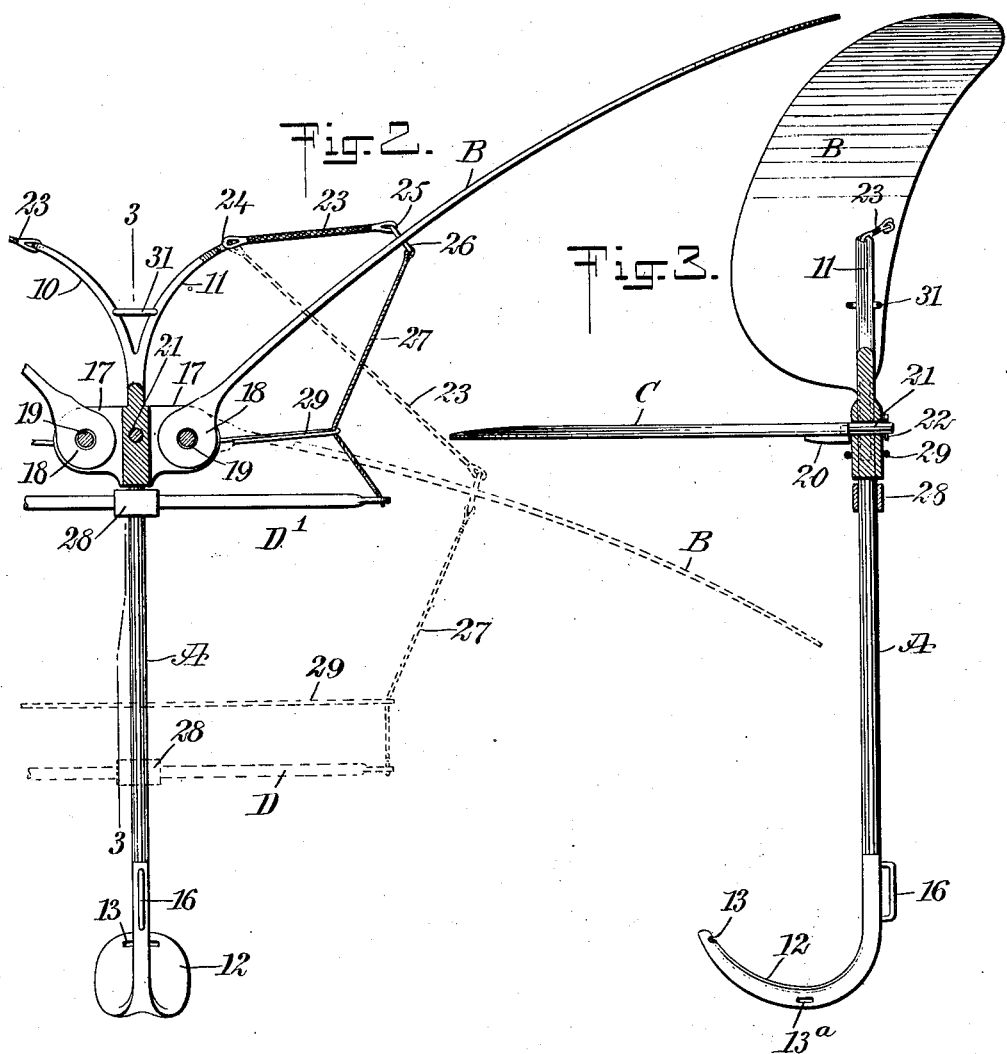

JAMES A. ELSTON, OF JEFFERSON CITY, MISSOURI.

AIR-SHIP.

No. 845,539.

Specification of Letters Patent.

Patented Feb. 26, 1907.

Application filed May 22, 1906. Serial No. 318,128.

*To all whom it may concern:*

Be it known that I, JAMES A. ELSTON, a citizen of the United States, and a resident of Jefferson City, in the county of Cole and State of Missouri, have invented a new and Improved Air-Ship, of which the following is a full, clear, and exact description.

The purpose of the invention is to provide an air ship or vessel which will be very light, yet strong, and wherein the operator will be comfortably seated and will be able to manually operate the vessel with ease and comparatively slight bodily exertion.

Another purpose of the invention is to provide a construction of aerial vessel in which wings are employed as a motive power, with or without the assistance of a balloon or gas-bag or its equivalent, and wherein also the operator will be effectually protected from the elements while working the vessel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved air-ship. Fig. 2 is a sectional front elevation of the major portion of the vessel, and Fig. 3 is a vertical section taken practically on the line 3 3 of Fig. 2.

In the construction of the vessel a perpendicular body-bar A is employed, which may be of any cross-sectional shape. Preferably, however, the said body-bar is rectangular in cross-section, and the upper end of the body-bar is forked, providing two oppositely-curved members 10 and 11. (Best shown in Figs. 1 and 2.) At the lower end of the said body-bar A a saddle 12 is formed by widening the said lower portion of the body-bar and curving it upward and rearward, so as to constitute an easy seat for the operator, as is indicated in Fig. 1. This saddle 12 is provided with openings 13 and 13ª, suitably located for the attachment of a harness 14, usually passed around the lower limbs and the shoulders of the operator. One or more straps 15 are also employed at the waist portion of the operator, and said straps are passed through a guide-loop 16 at the forward lower portion of the body-bar.

Adjacent to and below the bifurcated upper portion of the body-bar A opposing ears 17 are produced, being either integral with the said body-bar or attached thereto, and between the ears at opposite sides of the body-bar the inner flattened ends 18 of wings B are pivoted by means of suitable pins 19, and these wings are given the customary sweep, their upper faces being convexed and their under faces concaved.

The pivot-pins 19 for the wings are provided with rear extensions 20, which rear extensions serve in a measure to support what may be termed a "tailpiece" C, which occupies a rear horizontal position, being at right angles to the body-bar A. This tailpiece C is provided with a centrally-located stud 21 at its forward edge, and said stud is passed through an opening in the body-bar A between the pivot-points of the wings B, as is shown in Fig. 3. A cotter-pin 22 or its equivalent is passed through the forward end of the stud 21.

The tailpiece C and likewise the wings B are made of very light material—as, for example, aluminium—or they may be made of a light bamboo frame covered with fabric of any suitable description. The tailpiece C is not properly a rudder, since one is really not needed; but the said tailpiece C assists in balancing the machine and also protects the operator from the inclemency of the weather.

Springs 23, preferably elastic cables, are attached to the ends of the upper members 10 and 11 of the body-bar A, which members are provided with eyes 24 for that purpose, and the opposite ends of the elastic cables 23 are connected with staples or eyes 25, secured upon the upper faces of the wings B, usually at a point between their centers and their inner ends. Non-elastic cables 27 are secured at their upper ends by means of eyes 26 or their equivalents to the under faces of the wings B, preferably just below the point of attachment of the elastic cables 23, and the said non-elastic cables 27 are carried down and are secured to the end portions of a handle-bar D, having a central enlarged section 28, apertured so as to have sliding and guided movement on the body-bar A. An elastic loop 29 is made to connect the non-elastic cables 27.

In operation the operator will grasp the handle-bar D near each end, as is shown in Fig. 1, and need not necessarily relinquish his grasp while the machine is in flight. When the machine is to be started upward, the operator, whose feet are free, can run on the ground to give the machine an upward start as the handle-bar D is moved upward and downward to impart the necessary movement to the wings B, and as the wings are drawn downward and the elastic cables 23 are placed under tension when the wings are permitted to ascend the elastic loop or band 29 will assist the cables 23 in their upward influence on the wings. The steering is accomplished by the operator balancing his body, leaning to one side or the other or forward or rearward and by causing more weight to be brought to bear on one end of the handle-bar than on the other.

In order to lessen the work of the operator, a balloon or gas-bag E may be employed in connection with the wings B, and at such time the guy-ropes 30 of the balloon may be attached to a ring 31, secured to the upper bifurcated portion of the body-bar A; but a balloon is not essential to the successful operation of the machine.

Having thus described my invention, I claim as new and desire to secure by Letters Patent—

1. In an air-ship, a body structure, tension-controlled wings carried thereby, and a handle-bar slidably mounted upon the body structure and connected with said wings.

2. In an air-ship, a body structure, a saddle carried thereby, tension-controlled wings pivotally connected with the body structure, a handle-bar mounted to slide upon the body structure below the wings, and connections between the ends of the handle-bar and adjacent wings.

3. In an air-ship, a body structure, wings fitted to the body structure at opposite sides, a handle-bar mounted to slide upon the body structure below the said wings, the ends of the handle-bar extending beneath the wings, non-elastic connections between the ends of the handle-bar and said wings, and elastic connections between the upper portions of the wings and the upper portions of the body structure.

4. In an air-ship, a body-bar terminating at its lower end in a saddle, wings pivotally connected with the body-bar adjacent to its upper ends, springs attached to the upper portions of the said wings and to the upper end portions of the body-bar, a horizontal rearwardly-extending tailpiece secured to the body-bar adjacent to its pivotal connections with the wings, and cable connections between the ends of the handle-bar and the wings.

5. In an air-ship, a body structure, a saddle at the lower end portion of the said body structure, having means for attachment to a harness, the upper end of said body structure being bifurcated, wings pivoted to the body structure at opposite sides near the top, springs attached to the upper faces of the wings and to the upper members of the body structure, a handle-bar mounted to slide on the body structure below the wings, and cables connected with the ends of the said handle-bar and the under faces of the wings at points nearly opposite to the attachment of said wings with said springs, the said cables being non-elastic.

6. In an air-ship, the combination with a body-bar having its upper end forked, a rearwardly-extending saddle located at the lower end of the body-bar, having means for attachment to a harness, opposing wings pivotally connected with the body-bar near its upper or forked end, springs attached to the upper members of the body-bar and to the upper surfaces of the wings, a horizontal tailpiece secured to and extending rearwardly from the body-bar below the wings, a handle-bar mounted to slide on the body-bar below the said wings, non-elastic cables secured to the ends of the body-bar and to the under faces of the wings, and an elastic connection between said cables, located above the said handle-bar.

In testimony whereof I have signed my name to this specification in the presence of two subscribing witnesses.

JAMES A. ELSTON.

Witnesses:
L. D. GORDON,
F. W. ROER.